United States Patent
Odashima et al.

(10) Patent No.: US 10,997,449 B2
(45) Date of Patent: May 4, 2021

(54) INFORMATION PROCESSING SYSTEM, COMPUTER-READABLE RECORDING MEDIUM RECORDING FEATURE-POINT EXTRACTION PROGRAM, AND FEATURE-POINT EXTRACTION METHOD

(71) Applicant: FUJITSU LIMITED, Kawasaki (JP)

(72) Inventors: Shigeyuki Odashima, Tama (JP); Sosuke Yamao, Atsugi (JP); Shan Jiang, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/510,393

(22) Filed: Jul. 12, 2019

(65) Prior Publication Data
US 2019/0340456 A1    Nov. 7, 2019

Related U.S. Application Data

(63) Continuation of application No. PCT/JP2017/002391, filed on Jan. 24, 2017.

(51) Int. Cl.
  *H04N 7/18*   (2006.01)
  *G06K 9/20*   (2006.01)
  (Continued)

(52) U.S. Cl.
  CPC ......... *G06K 9/209* (2013.01); *G06K 9/00697* (2013.01); *G06K 9/00778* (2013.01); *G06K 9/4652* (2013.01); *G06K 9/6256* (2013.01)

(58) Field of Classification Search
  CPC ...... G06K 9/00; G06K 9/209; G06K 9/00697; G06K 9/00778; G06K 9/4652; G06K 9/6256; H04N 7/18
  (Continued)

(56) References Cited

U.S. PATENT DOCUMENTS 7,184,885 B2 *  2/2007  Watanabe ............... G01C 21/36
                                              340/995.23
7,898,437 B2 *  3/2011  Okada ...................... G01C 7/04
                                              340/436

(Continued)

FOREIGN PATENT DOCUMENTS

JP    5-181949    7/1993
JP   2005-265494  9/2005
(Continued)

OTHER PUBLICATIONS

International Search Report, mailed in connection with PCT/JP2017/002391 and dated Apr. 4, 2017 (1 page).
(Continued)

*Primary Examiner* — Trang U Tran
(74) *Attorney, Agent, or Firm* — Fujitsu Patent Center

(57) ABSTRACT

An information processing apparatus includes: a memory; and a processor coupled to the memory and configured to: acquire feature points from a shot image; calculate, from each of the acquired feature points, with preset conditions, a plurality of context feature amounts that has a success-or-failure vector of a single-attribute; and extract, from among the acquired feature points, feature points of which a product of the plurality of context feature amounts is equal to or greater than a preset threshold.

15 Claims, 13 Drawing Sheets

(51) Int. Cl.
*G06K 9/00* (2006.01)
*G06K 9/46* (2006.01)
*G06K 9/62* (2006.01)

(58) Field of Classification Search
USPC .................................. 382/104, 113; 348/148
See application file for complete search history.

(56) References Cited

U.S. PATENT DOCUMENTS

| 8,630,461 | B2* | 1/2014 | Miyajima | G01C 21/28 382/104 |
|---|---|---|---|---|
| 2006/0233424 | A1* | 10/2006 | Miyajima | G06T 7/73 382/104 |
| 2011/0243379 | A1 | 10/2011 | Miyajima et al. | |
| 2013/0188837 | A1 | 7/2013 | Takahashi | |
| 2016/0305794 | A1 | 10/2016 | Horita et al. | |

FOREIGN PATENT DOCUMENTS

| JP | 2011-215053 | 10/2011 |
|---|---|---|
| JP | 2011-215974 | 10/2011 |
| JP | 2012-185011 | 9/2012 |
| JP | 2015-108604 | 6/2015 |
| JP | 2016-143324 | 8/2016 |
| WO | 2012/046671 | 4/2012 |

OTHER PUBLICATIONS

Written Opinion of the International Searching Authority, mailed in connection with PCT/JP2017/002391, and dated Apr. 4, 2017, with partial English translation (7 pages).
JPOA—Office Action of Japanese Patent Application No. 2018-563974 dated Mar. 17, 2020 with Full Machine Translation. **References cited in JPOA were previously submitted in the IDS filed Jul. 12, 2019 and considered by the Examiner on Apr. 28, 2020.

* cited by examiner

FIG. 4
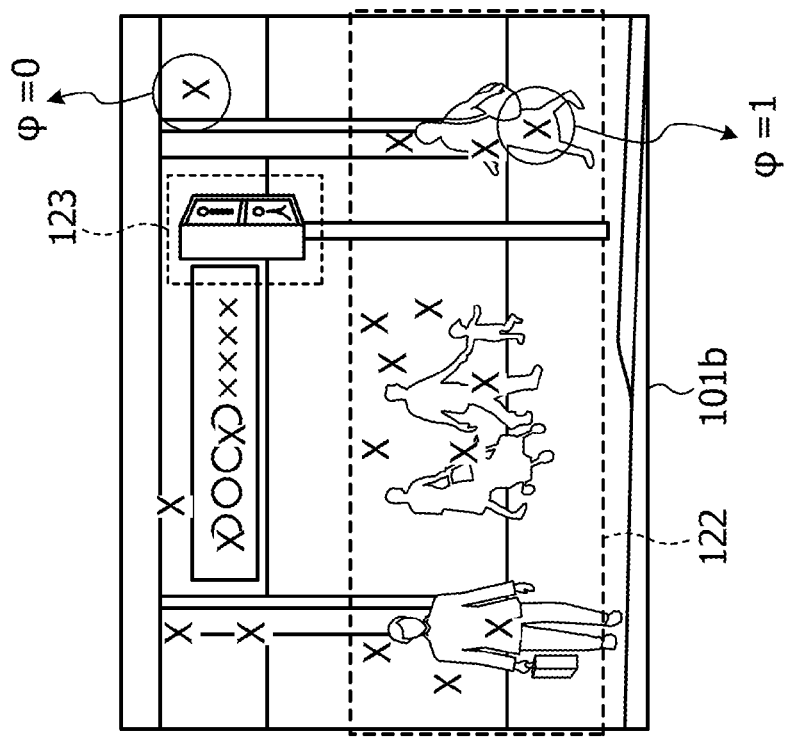
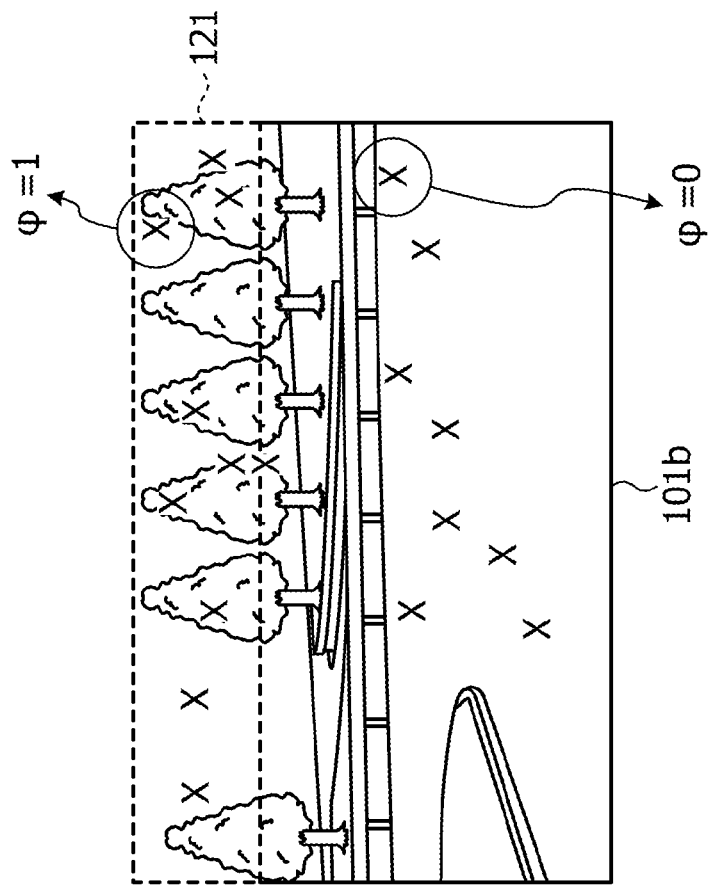

FIG. 9
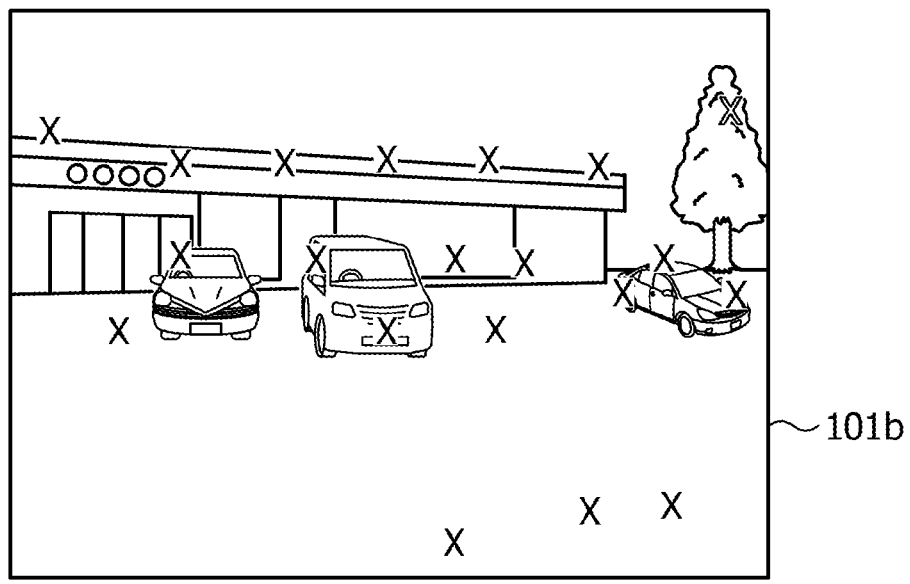
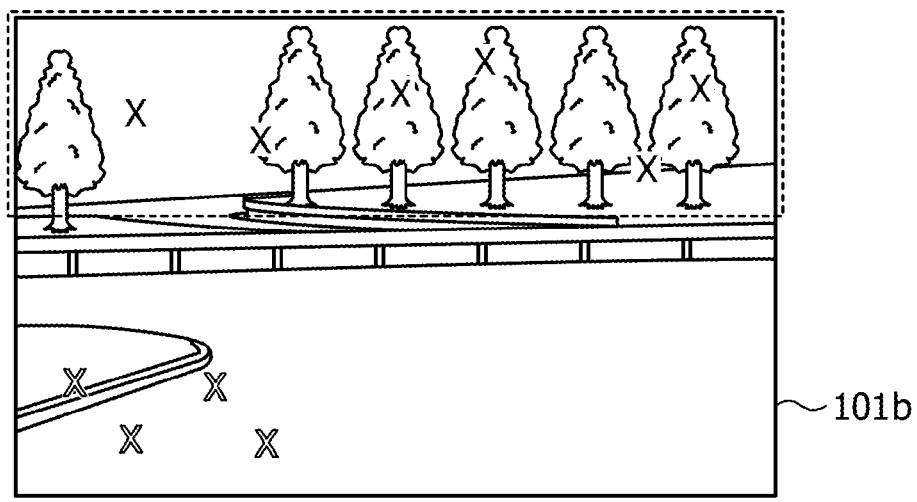

INFORMATION PROCESSING SYSTEM, COMPUTER-READABLE RECORDING MEDIUM RECORDING FEATURE-POINT EXTRACTION PROGRAM, AND FEATURE-POINT EXTRACTION METHOD

CROSS-REFERENCE TO RELATED APPLICATION

This application is a continuation application of International Application PCT/JP2017/002391 filed on Jan. 24, 2017 and designated the U.S., the entire contents of which are incorporated herein by reference.

FIELD

Embodiments relate to an information processing apparatus, a feature-point extraction program, and a feature-point extraction method.

BACKGROUND

There has been a self-position estimation technique of estimating the position of oneself on a map, as a technique of achieving autonomous movement such as automatic drive, and travel control of a robot. Map information for self-position estimation retains feature points of a scenic image on a map in order to make association with an input of a sensor such as a camera installed in a device that moves autonomously.

Related art is disclosed in International Publication Pamphlet No. WO 2012/46671, Japanese Laid-open Patent Publication No. 2012-185011, Japanese Laid-open Patent Publication No. 2011-215053, Japanese Laid-open Patent Publication No. 2011-215974, and Japanese Laid-open Patent Publication No. 2015-108604.

SUMMARY

According to an aspect of the embodiments, an information processing apparatus includes: a memory; and a processor coupled to the memory and configured to: acquire feature points from a shot image; calculate, from each of the acquired feature points, with preset conditions, a plurality of context feature amounts that has a success-or-failure vector of a single-attribute; and extract, from among the acquired feature points, feature points of which a product of the plurality of context feature amounts is equal to or greater than a preset threshold.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is an explanatory illustration for describing the respective positions of feature points in a shot space.

FIG. 9 is an explanatory illustration for describing extraction of a stable feature point with co-occurrence of context features of a plurality of feature points.

DESCRIPTION OF EMBODIMENTS

The scenic image includes, for example, an appearance of a temporarily moving object such as a person. As a result, use of all the feature points of the scenic image for self-position estimation may results in destabilized self-position estimation. Thus, in self-position estimation, a stable feature point that has no fluctuation (hereinafter, stable feature point) is extracted from among the feature points of a scenic image.

Examples of techniques of extracting a stable feature point include a technique in which a region corresponding to a thing with little possibility that the position or shape is maintained as it is for a predetermined period of time or longer in the real world is extracted from a scenic image, and then feature points extracted from the extracted region are eliminated.

The above technique, however, uses a feature amount based on a long-time observation of a subject in order to extract a stable feature point. Thus, there is disadvantage in that, for example, a long-time observation of scenic images at the same position is required, thereby complicating the extraction of the stable feature point.

In one aspect, an information processing apparatus, a feature-point extraction program, and a feature-point extraction method that are capable of facilitating extraction of a stable feature point may be provided.

Hereinafter, an information processing apparatus, a feature-point extraction program, and a feature-point extraction method according to an embodiment will be described with reference to the drawings. The configurations with the same functions in the embodiment are denoted by the same reference signs, and the redundant description will be omitted. Note that the information processing apparatus, the feature-point extraction program, and the feature-point extraction method to be described in the following embodiment are merely an example, and thus the embodiment is not limited thereto. In addition, each embodiment below may be appropriately combined within the scope of no contradiction.

Figure 1:
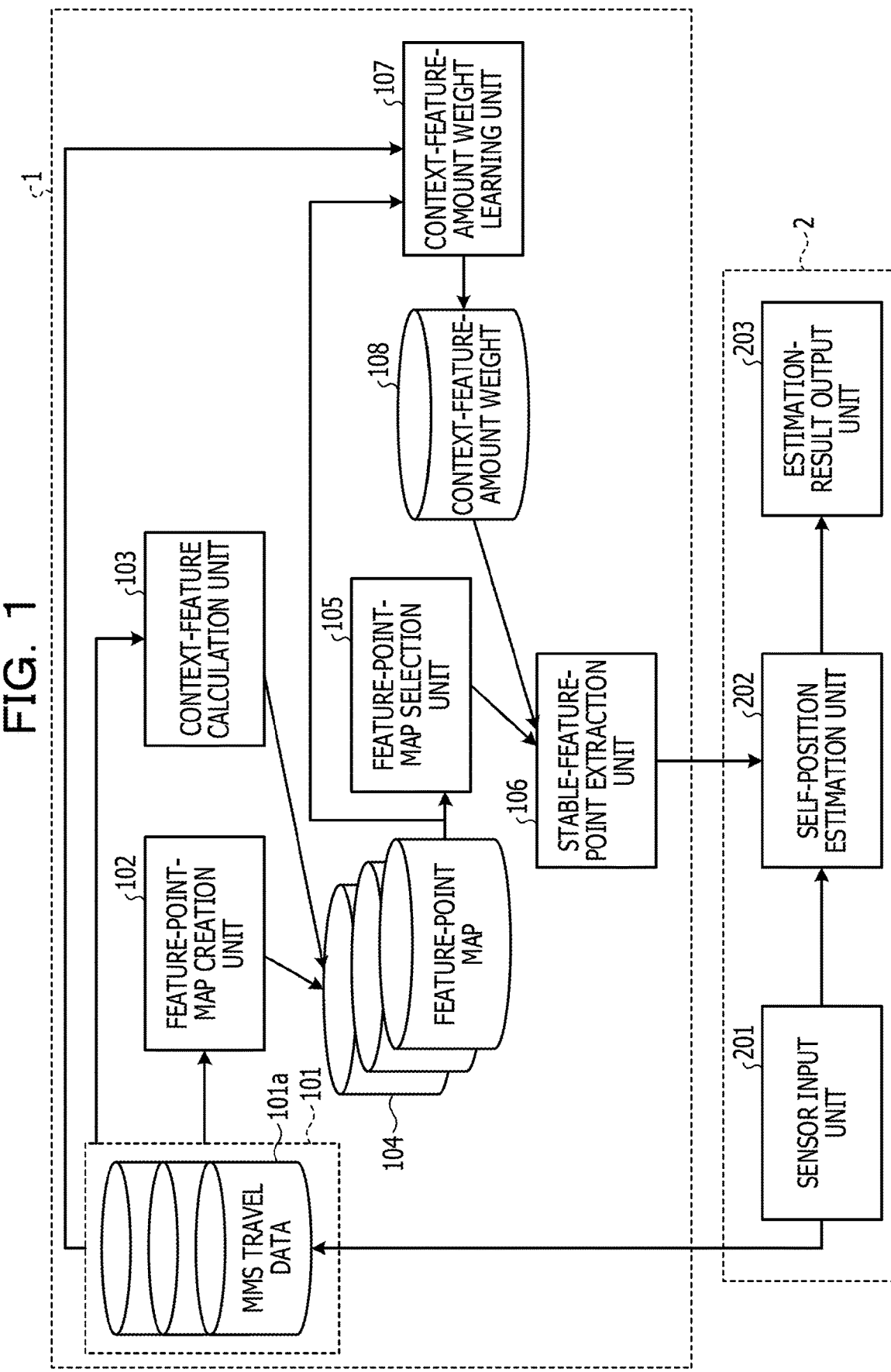
FIG. 1 is a block diagram of an exemplary functional configuration of an information processing apparatus according to an embodiment.

FIG. 1 is a block diagram of an exemplary functional configuration of the information processing apparatus according to the embodiment. As illustrated in FIG. 1, an information processing apparatus 1 serves as a computer that executes processing on stable-feature-point extraction, from mobile mapping system (MMS) travel data 101a including a peripheral scenic image shot with a vehicle 2 during driving (hereinafter, referred to as a shot image). Note that the information processing apparatus 1 may be an on-vehicle computer mounted on the vehicle 2, or may be a personal computer (PC) or cloud computing that is separate from the vehicle 2.

The information processing apparatus 1 includes: a storage unit 101; a feature-point-map creation unit 102; a context-feature calculation unit 103; a feature-point-map selection unit 105; a stable-feature-point extraction unit 106; and a context-feature-amount weight learning unit 107. Note that, for example, in a case where the information processing apparatus 1 is an on-vehicle computer mounted on the vehicle 2, the information processing apparatus 1 may include a sensor input unit 201, a self-position estimation unit 202, and an estimation-result output unit 203 in the vehicle 2.

The storage unit 101 serves as a storage device such as a hard disk drive (HDD). The storage unit 101 stores MMS travel data 101a collected and acquired with the vehicle 2 having a sensor device in the MMS mounted thereon, such as a global positioning system (GPS), a laser scanner, and a camera. The MMS travel data 101a is stored with information indicating a state, for example, for each state at the time of data collection, such as a time zone (e.g., daytime or evening) and weather (e.g., fine weather or rainy weather) imparted.

The MMS travel data 101a includes information on the travel position and orientation of the vehicle 2 with the GPS or the like, and three-dimensional point cloud data that represents the position of an object including a shot image (object shot with the camera), together with a shot image shot with the camera during traveling of the vehicle 2. The three-dimensional point cloud data indicates three-dimensional position information based on the travel position and orientation of the vehicle 2, and the distance from the vehicle 2 to the object and orientation measured with a laser scanner or the like.

The feature-point-map creation unit 102 acquires feature points each corresponding to the object included in the shot image, on the basis of the object detection result of the shot image included in the MMS travel data 101a and shot with the camera during traveling of the vehicle 2. That is, the feature-point-map creation unit 102 is an example of an acquisition unit that acquires feature points from a shot image.

Examples of object detection from a shot image in the feature-point-map creation unit 102 that can be used include an object recognition with histograms of oriented gradients (HoG) features and a support vector machine (SVM). Alternatively, a deep learning model such as a Faster R-CNN method may also be used for object detection.

Next, the feature-point-map creation unit 102 creates a feature-point map 104 as three-dimensional position information on each acquired feature point, on the basis of the three-dimensional point cloud data included in the MMS travel data 101a. That is, the feature-point map 104 is an example of map information including position information on each feature point.

Note that the feature-point-map creation unit 102 creates a feature-point map 104 for each state, on the basis of MMS travel data 101a for each state such as a time zone (e.g., daytime or evening) and weather (e.g., fine weather or rainy weather).

The context-feature calculation unit 103 calculates with preset conditions, for each feature point acquired with the feature-point-map creation unit 102, a plurality of context feature amounts having a success-or-failure vector of a single-attribute. Next, the context-feature calculation unit 103 provides the plurality of context feature amounts calculated for each feature point into each feature point at the feature-point map 104 and makes registration of the resultant. As a result, the feature-point map 104 includes the plurality of context feature amounts at each feature point, together with position information on each feature point.

Each of the context feature amounts calculated with the context-feature calculation unit 103 relates to the position of the feature point, the movement of the feature point, the appearance of the feature point, and the like, and indicates a feature amount at each feature point indicating success or failure for an attribute, with the preset conditions.

For example, the contest feature amount has, a success-or-failure vector defined as "1" when one preset condition is satisfied and "0" when the condition is unsatisfied, for a single-attribute with the preset one condition. Note that the single-attribute includes the position of the feature point in a shot space, the movement of the feature point in the shot space, and the existence probability of the color or shape of the feature point in the shot space. The context-feature calculation unit 103 calculates a success-or-failure vector for each preset condition, for each feature point acquired with the feature-point-map creation unit 102, and calculates a plurality of context feature amounts. Note that, the present example describes a value that a context feature can take as a binary of 0/1. The context feature, however, may be, for example, a continuous value that takes a value between 0 and 1 such as a probability value, or may take an entire real value such as a recognition score with, for example, a support vector machine.

As an example, the context-feature calculation unit 103 determines, for each feature point, the presence or absence of an attribute related to the position of the feature point, with a condition of whether the height at which the feature point exists is 1 m or higher. In addition, the context-feature calculation unit 103 determines the presence or absence of an attribute related to the movement of the feature point, with a condition of whether the movement of the feature point (movement vector of the feature point in a shot image) is equal to or less than a certain value. Furthermore, the context-feature calculation unit 103 determines the presence or absence of an attribute related to the existence probability of the color or shape of the feature point, with a condition of whether the appearance of the feature point (existence probability of color or shape) is equal to or greater than a threshold. The context-feature calculation unit 103 calculates a plurality of context feature amounts having a success-or-failure vector for each attribute, on the basis of these determination results.

Figure 2:
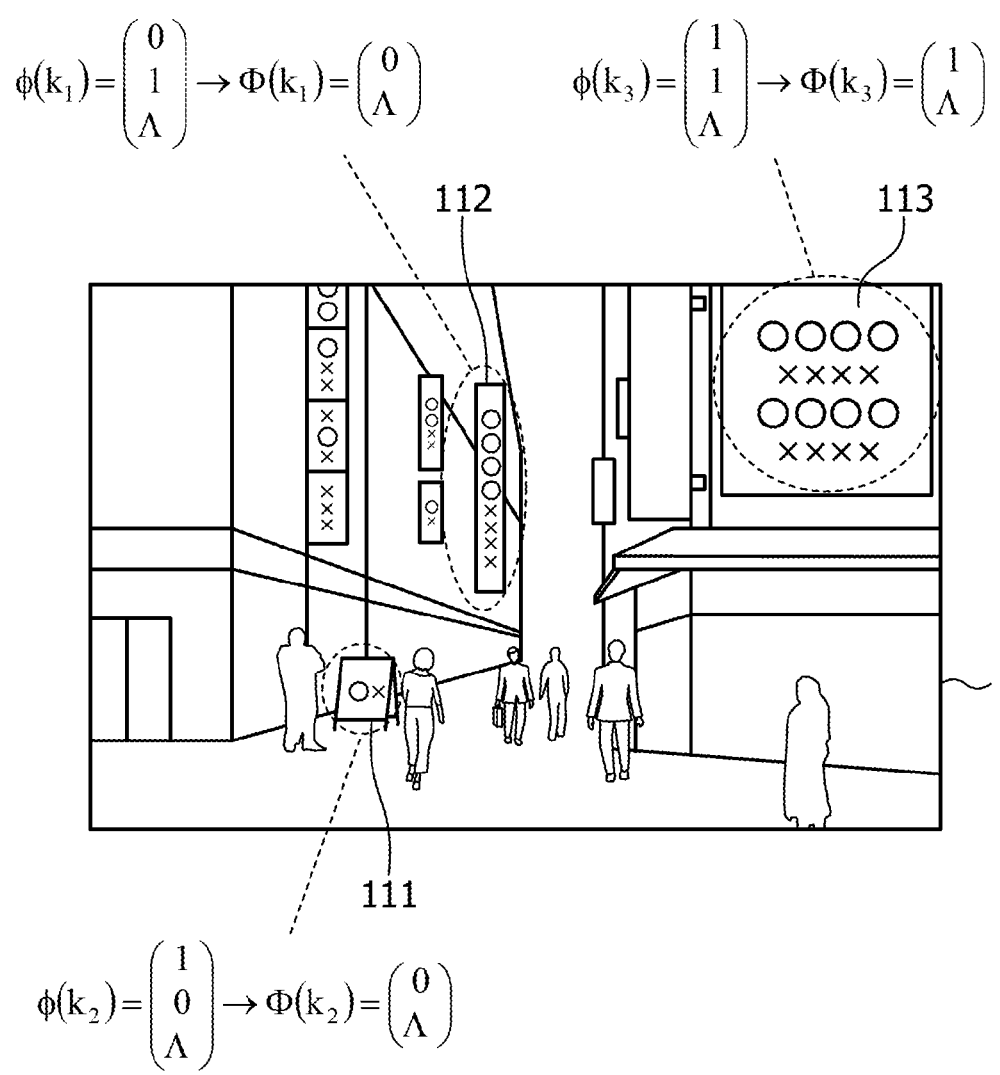
FIG. 2 is an explanatory illustration for describing context feature amounts.

FIG. 2 is an explanatory illustration for describing context feature amounts. Note that, in the example of FIG. 2, it is assumed that signboards 111 to 113 have been acquired as feature points from a shot image 101b. For each feature point $(k_1, k_2, \ldots, k_i)$ in the shot image 101b, the context-feature calculation unit 103 obtains a plurality of context feature amounts $\phi(k_i)$=(appearance of the feature point is equal to or greater than the threshold, height at which the feature point exists is 1 m or higher, . . . ).

For example, the signboard 112 with vertical characters is provided with similar signboards arranged in the periphery of the signboard 112. Thus, the appearance of the feature points is lower, and the score indicating the appearance is less than the threshold. In addition, the signboard 112 is located above persons walking on the road, and has a height of 1 m or higher. Thus, $\phi(k_1)=(0, 1, \ldots)$.

On the other hand, the signboard 111 with horizontal characters is provided without a similar signboard arranged in the periphery of the signboard 111. Thus, the appearance of the feature point is higher, and the score indicating the appearance is equal to or higher than the threshold. In addition, the signboard 111 is located on the road, and has a height less than 1 m. Thus, $\phi(k_2)=(1, 0, \ldots)$.

The signboard 113 with vertical characters is provided without a similar signboard arranged in the periphery of the signboard 113. Thus, the appearance of the feature point is higher, and the score indicating the appearance is equal to or higher than the threshold. In addition, the signboard 113 is located above persons walking on the road, and has a height of 1 m or higher. Thus, $\phi(k_3)=(1, 1, \ldots)$.

The feature point ($k_2$) corresponding to the signboard 111 having a lower height is likely to be occluded by a passerby on the road or the like, so that the feature point ($k_2$) is difficult to be a stable feature point. The feature point ($k_1$) corresponding to the signboard 112 is higher, so that the feature point ($k_1$) is unlikely to be occluded by a passerby on the road or the like. The feature point ($k_1$), however, is lower in appearance and confused with a different feature point, so that the feature point ($k_1$) is unlikely to be a stable feature point. On the other hand, the feature point ($k_3$) corresponding to the signboard 113 higher in height and appearance is unlikely to be occluded by a passerby on the road or the like and unlikely to be confused with a different feature point. Thus, the feature point ($k_3$) is likely to be a stable feature point.

As described above, even in the case where, with a single-attribute value at a feature point, that is one context feature amount, descriptive power is weak for discrimination of whether the feature point is a stable feature point, a stable feature point can be extracted with a logical product of a combination of a plurality of context feature amounts.

Thus, a score of $\phi(k_i)$=(appearance of the feature point is equal to or higher than the threshold and height at the feature point exists is 1 m or higher, ... ) is obtained, and when the obtained score is equal to or higher than a predetermined threshold, the feature point can be obtained as a stable feature point without use of feature amounts based on a long-time observation of a subject. In the above example, $\phi(k_1)$ and $\phi(k_2)$ are $(0, \ldots)$; however, $\phi(k_3)$ is $(1, \ldots)$ and the score is higher. Thus, the feature point ($k_3$) corresponding to the signboard 113 can be extracted as a stable feature point.

The feature-point-map selection unit 105 selects, from among feature-point maps 104, a feature-point map 104 corresponding to a state (e.g., time or weather) of the current time point in which self-position is to be estimated. Specifically, the feature-point-map selection unit 105 collects information such as time and weather at the current time point from an external network (e.g., the Internet), and selects a feature-point map 104 that matches a state of the current time point. The feature-point-map selection unit 105 outputs the selected feature-point map 104 to the stable-feature-point extraction unit 106. As a result, the information processing apparatus 1 can extract the stable feature points from the feature-point map 104 that matches the current time point at which the vehicle 2 is to estimate a self-position.

The stable-feature-point extraction unit 106 calculates, for each feature point included in the feature-point map 104, the product of the plurality of context feature amounts calculated with the context-feature calculation unit 103. Note that it is assumed that among the plurality of context feature amounts, a combination of the context feature amounts which product to be calculated are preset. Next, the stable-feature-point extraction unit 106 extracts, as a stable feature point, a feature point with the product value of the plurality of context feature amounts calculated, equal to or greater than a preset threshold.

Specifically, the stable-feature-point extraction unit 106 multiplies each of the plurality of context feature amounts at each feature point by a context-feature-amount weight 108 for each of a plurality of context feature amounts learnt with the context-feature-amount weight learning unit 107. Then, the stable-feature-point extraction unit 106 calculates the product of the plurality of context feature amounts with the context-feature-amount weight 108 reflected, and extracts a stable feature point with the product value equal to or greater than the preset threshold.

Figure 3:
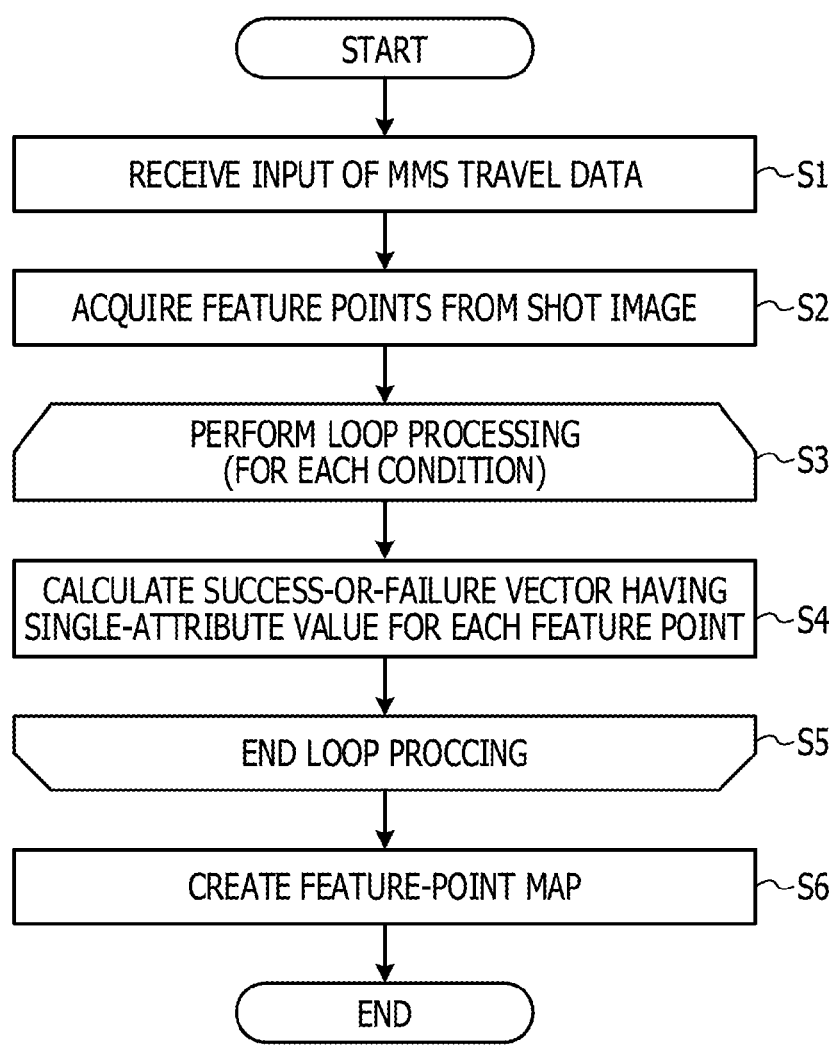
FIG. 3 is a flowchart exemplifying the operation of creating a feature-point map.

Here, there will be specifically described the flow of processing from creation of a feature-point map 104 to extraction of a stable feature point from the created feature-point map 104. FIG. 3 is a flowchart exemplifying the operation of creating a feature-point map.

As illustrated in FIG. 3, when the processing starts, the feature-point-map creation unit 102 receives an input of MMS travel data 101*a* (S1), and acquires a feature point from a shot image 101*b* included in the MMS travel data 101*a*, on the basis of the object detection result (S2).

Next, the context-feature calculation unit 103 performs loop processing on which a success-or-failure vector having an attribute value for each feature point acquired with the feature-point-map creation unit 102 is obtained, for each preset condition regarding, for example, the position of a feature point, the movement of the feature point, the appearance of the feature point, or the like (S3 to S5).

Specifically, when the loop processing starts (S3), the context-feature calculation unit 103 acquires one condition from among the preset conditions regarding, for example, the position of the feature point in a shot space, the movement of the feature point in the shot space, and the existence probability of the color or shape of the feature point in the shot space. Next, the context-feature calculation unit 103 determines, for each feature point, whether the acquired one condition is satisfied, and then calculates a success-or-failure vector having a single-attribute value (S4). The context-feature calculation unit 103 performs the above processing for all the preset conditions, and ends the loop processing (S5).

Next, the context-feature calculation unit 103 provides a plurality of context feature amounts calculated for each feature point into each feature point and creates a feature-point map 104 (S6).

FIG. 4 is an explanatory illustration for describing the respective positions of feature points in a shot space. As illustrated on the left side of FIG. 4, the context-feature calculation unit 103 may also obtain success-or-failure vectors ($\phi$) for respective feature points included in a shot image 101*b* ("X" in the drawing), on the basis of whether the feature points exist within a region 121 having a height of 3 m to 5 m from the road. For example, feature points existent in the region 121 each are defined as a success-or-failure vector $\phi=1$, and feature points non-existent in the region 121 each are defined as a success-or-failure vector $\phi=0$. This success-or-failure vector allows determination that "an object (feature point) at a high place is unlikely to be occluded".

In addition, as illustrated on the right side of FIG. 4, the context-feature calculation unit 103 may also obtain a success-or-failure vectors (φ) for respective feature points included in a shot image 101b, on the basis of whether a distance from a region 123 corresponding to a traffic signal detected on the basis of the object detection result is equal to or greater than the threshold. For example, for a feature point which distance from the region 123 is less than the threshold, the feature point is defined as a success-or-failure vector φ=0, and for a feature point having the threshold or greater, the feature point is defined as a success-or-failure vector φ=1. This success-or-failure vector allows determination that "persons are likely to gather near the traffic signal and an object (feature point) is unlikely to be occluded".

Note that in description of a success-or-failure vector, description of the relationship between an object detected on the basis of the object detection result and a feature point, for example, "the feature point is included in a vehicle region" allows implicitly expressing facilitative recognition disappearance. In addition, use of an object recognition score (e.g., score value indicating object likeness) instead of direct use of an object detection result allows discrimination, for example, "an object having an object recognition score in some degree for a vehicle and a bus is an item of playground equipment in a park, so that the object recognition score can be used as a stable feature point exceptionally". Furthermore, use of a success-or-failure vector for an attribute value simultaneously describes a region including a feature point simultaneously with an object detection result, such as "20% of inclusion in the upper part of a house" allows discrimination, for example, snow is likely to accumulate on the roof and the feature point is unsuitable to be used as a stable feature point.

Figure 5:
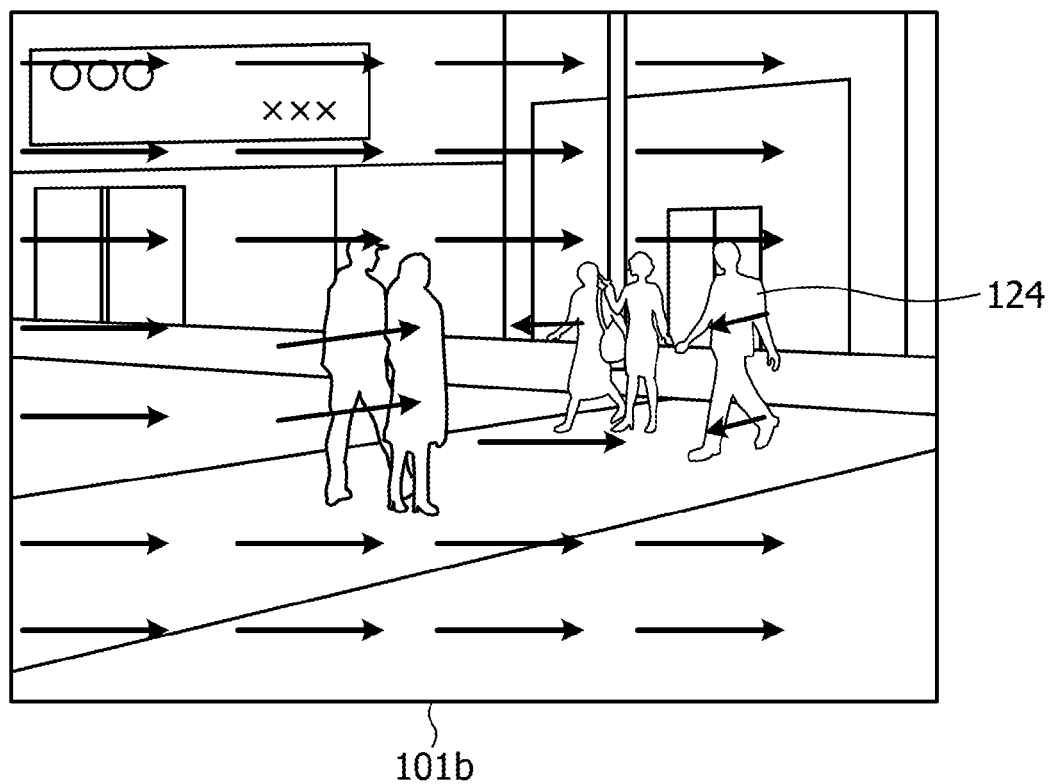
FIG. 5 is an explanatory illustration for describing the movement of feature points in a shot space.

FIG. 5 is an explanatory illustration for describing the movement of feature points in a shot space. As illustrated in FIG. 5, the context-feature calculation unit 103 is capable of obtaining the movement of a feature point corresponding to a person 124 or the like, on the basis of the difference value between optical flows in the periphery of feature points included in a shot image 101b and the median value of the entire shot image 101b.

Furthermore, the movement of a feature point may be obtained, on the basis of the difference amount between the blur amount of the periphery of feature points obtained with autocorrelation and the blur amount of the entire shot image 101b. Note that the difference amount from the blur amount of the entire shot image 101b is used because a camera mounted on the vehicle 2 is highly likely to be moving, and thus there is a possibility that the movement of an actually stationary object is also observed when the movement amount of the feature point is used simply.

On the basis of the movement of the obtained feature point, a success-or-failure vector of whether the feature point has movement equal to or greater than a threshold is calculated. This success-or-failure vector allows determination that "the moving object is highly likely to disappear".

Figure 6:
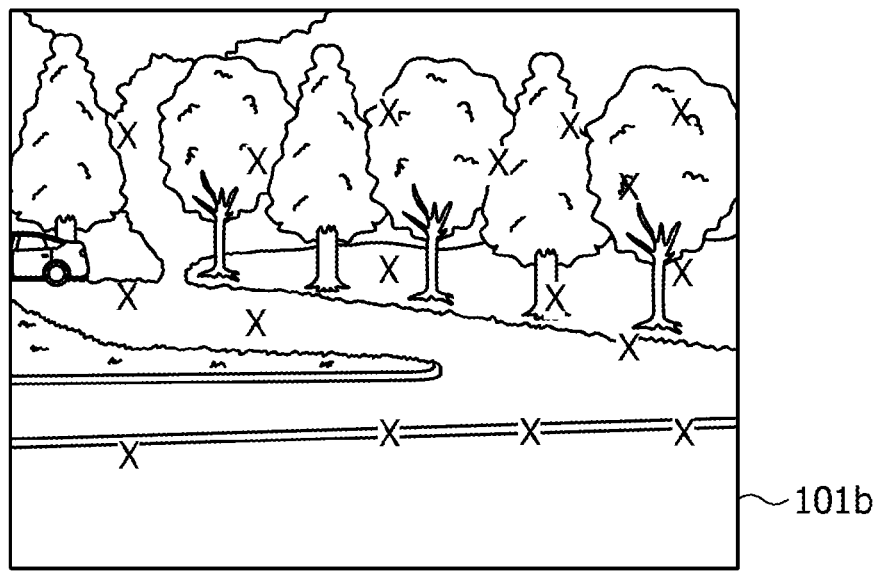
FIG. 6 is an explanatory illustration for describing the existence probability of the color or shape of feature points in a shot space.

FIG. 6 is an explanatory illustration for describing the existence probability (existence probability of color in the illustrated example) of the color or shape of feature points in a photo space. As illustrated in FIG. 6, the context-feature calculation unit 103 obtains the existence probability of the vector quantization of a visual feature (e.g., feature related to a color such as green, brown, and white) of feature points included in a shot image 101b. This existence probability indicates information for describing "whether a feature point is easily identified in a shot space" and implicitly expresses facilitative identification of a feature point. For example, the existence probability of a brown feature point is smaller than the presence probability of a green or white feature point.

Thus, the brown feature point can be said to be a stable feature point that is easily identified.

Note that in calculation of the "existence probability", the context-feature calculation unit 103 may also obtain, for example, the existence probability of each feature point in a public database such as ImageNet. In addition, the context-feature calculation unit 103 may extract feature points from the previous or next frames of a frame from which feature points have been extracted, and may obtain the existence probability of each feature point with the distributions of the existence probability.

On the basis of the obtained existence probability of the feature point, a success-or-failure vector of whether the feature point having the existence probability equal to or less than a threshold is calculated. This success-or-failure vector allows determination that "whether the feature point is easily identified in the shot space.

Figure 7:
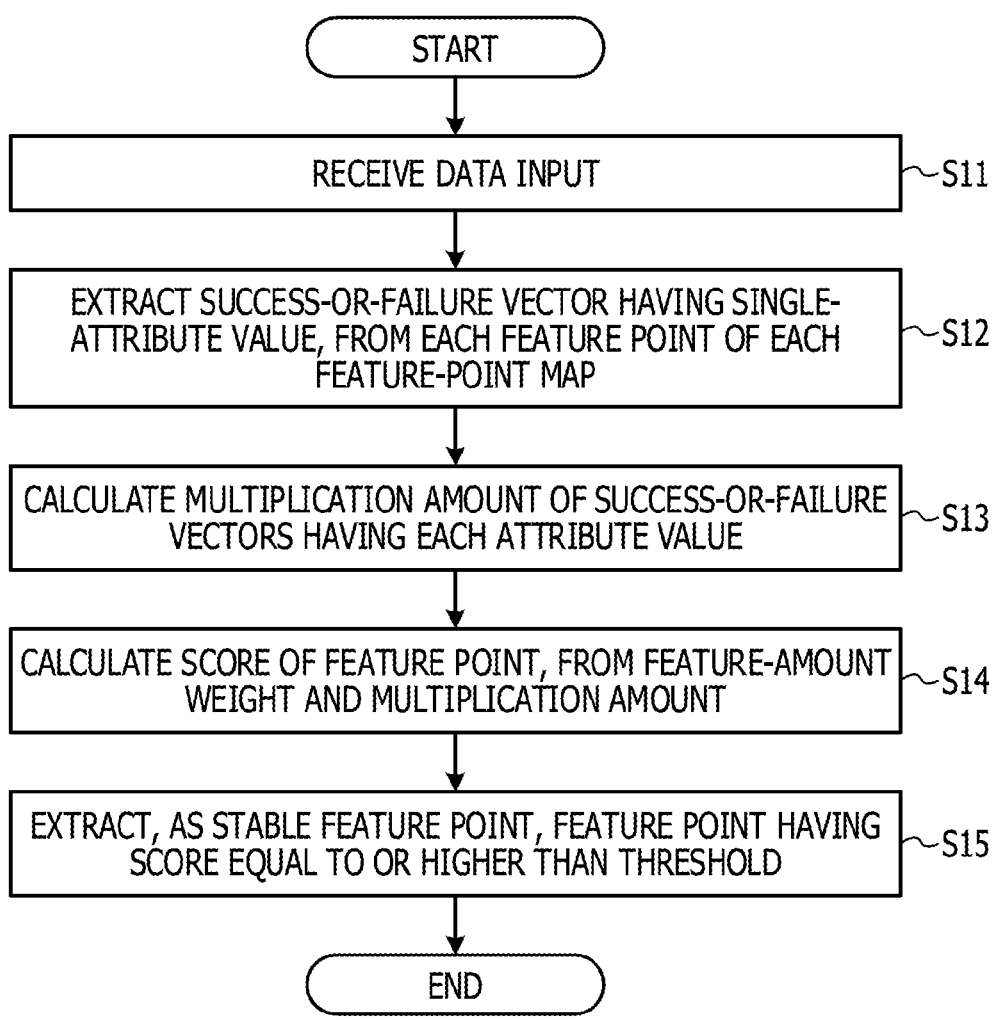
FIG. 7 is a flowchart exemplifying the operation of extracting a stable feature point.

FIG. 7 is a flowchart exemplifying the operation of extracting a stable feature point. As illustrated in FIG. 7, when the processing starts, the stable-feature-point extraction unit 106 receives data input of a feature-point map 104 selected with the feature-point-map selection unit 105 (S11).

Next, the stable-feature-point extraction unit 106 extracts a success-or-failure vector having a single-attribute value, that is, a plurality of context feature amounts calculated with the context-feature calculation unit 103, from each feature point of each feature-point map 104 that has been input (S12).

Next, the stable-feature-point extraction unit 106 multiplies the success-or-failure vectors having each attribute value, on the basis of a preset combination of context feature amounts, such as having a height equal to or greater than a threshold and also having an appearance equal to or greater than the threshold for the appearance. The stable-feature-point extraction unit 106 calculates, with this multiplication, the multiplication amount (product value) of the success-or-failure vectors (S13).

Next, the stable-feature-point extraction unit 106 calculates the score of a feature point that is an evaluation value as a stable feature point, from the context-feature-amount weight 108 for the context feature amounts of the success-or-failure vectors subjected to the multiplication and the multiplication amount (S14). Specifically, the stable-feature-point extraction unit 106 calculates a score through integration of the context-feature-amount weight 108 for the context feature amounts of the success-or-failure vectors subjected to the multiplication, with the multiplication amount. Next, the stable-feature-point extraction unit 106 extracts, as a stable feature point, a feature point having a score equal to or higher than a preset threshold (S15).

Figure 8:
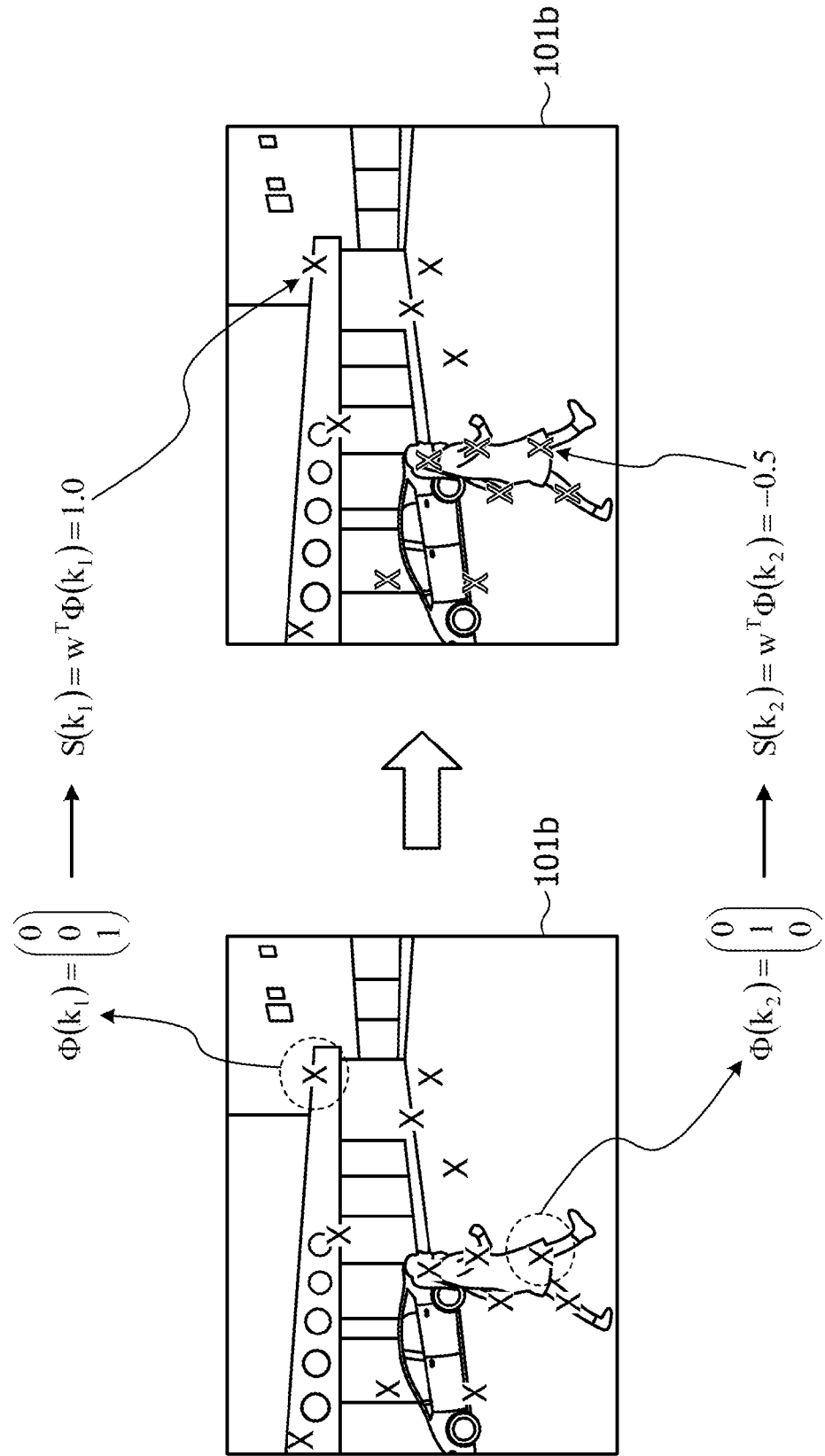
FIG. 8 is an explanatory illustration for describing extraction of a stable feature point.

FIG. 8 is an explanatory illustration for describing extraction of a stable feature point. In the example illustrated in FIG. 8, there is obtained, as a plurality of context feature amounts φ, (whether the height is 1 to 3 m, whether the movement amount is equal to or greater than a threshold, and whether the existence probability of the visual feature is equal to or less than a threshold). For example, for the feature point of the upper right building, $\phi(k_1)=(0, 0, 1)$. In addition, for the feature point of the lower left passerby, $\phi(k_2)=(0, 1, 1)$.

The stable-feature-point extraction unit 106 multiplies a logical product φ of a combination of the plurality of context feature amounts by the context-feature-amount weight 108 ($w_T$) to obtain $S(k_1)$ and $S(k_2)$ that are the scores of the feature points, respectively. For example, when the context-feature-amount weight 108 ($w_T$) is defined as $w_T=(1.0, -0.5, 1.0)$, the score for the feature point of the upper right building is $S(k_1)=1$. In addition, the score for the feature point of the lower left passerby is $S(k_2)=-0.5$.

Next, the stable-feature-point extraction unit 106 compares the respective scores ($S(k_1)$, $S(k_2)$) of the feature points with a preset threshold (e.g., 0.5) to extract the feature point of the upper right building as a stable feature point. As described above, the information processing apparatus 1 is capable of easily obtaining a stable feature point with extraction of the stable feature point on the basis of a logical product of a combination of a plurality of context feature amounts, without use of feature amounts based on a long-time observation of a subject.

Note that, as a method of extracting a stable feature point with a combination of a plurality of context feature amounts, the stable-feature-point extraction unit 106 may use a method other than the method of extracting a stable feature point with obtaining of a product of a plurality of context feature amounts for each feature point. For example, the stable-feature-point extraction unit 106 may extract a stable feature point with use of not only the multiplication amount of a plurality of context feature amounts at a single feature point (co-occurrence amount of context features at a single feature point) but also the combination amount of the context feature amounts of a plurality of feature points (co-occurrence amount of context features at a plurality of feature points).

For example, the stable-feature-point extraction unit 106 may use the co-occurrence amount of context features of a plurality of feature points such as "whether a feature point having a specific attribute value within a certain range has been selected as a stable feature point", and may extract a combination of stable feature points having the highest score.

FIG. 9 is an explanatory illustration for describing extraction of a stable feature point with co-occurrence of context features of a plurality of feature points. Note that, in the example of FIG. 9, it is assumed that a stable feature point is extracted under the condition of (selection of a feature point having a movement amount of 1 to 3 pixels and selection of a feature point within a height of 1 to 3 m from the road). In a shot image 101b in the upper part of FIG. 9, stationary feature points (black "X"s) around 1 to 3 m are existent, so that the feature points are preferentially extracted. The feature point of the tree (solid-white "X") is not extracted as a stable feature point because the tree moves swaying in wind or the like.

In a shot image 101b in the lower part of FIG. 9, stationary feature points around 1 to 3 m are not existent, so that the feature point (black "X") of the tree with movement swaying in wind is extracted as a second best. Thus, use of the combination amount of context feature amounts of a plurality of feature points allows increase in robustness of stable-feature-point selection.

Returning back to FIG. 1, the context-feature-amount weight learning unit 107 learns the context-feature-amount weight 108 to be multiplied by the respective context feature amounts, so as to reduce errors in the case of self-position estimation with the stable feature point extracted with the stable-feature-point extraction unit 106.

Figure 10:
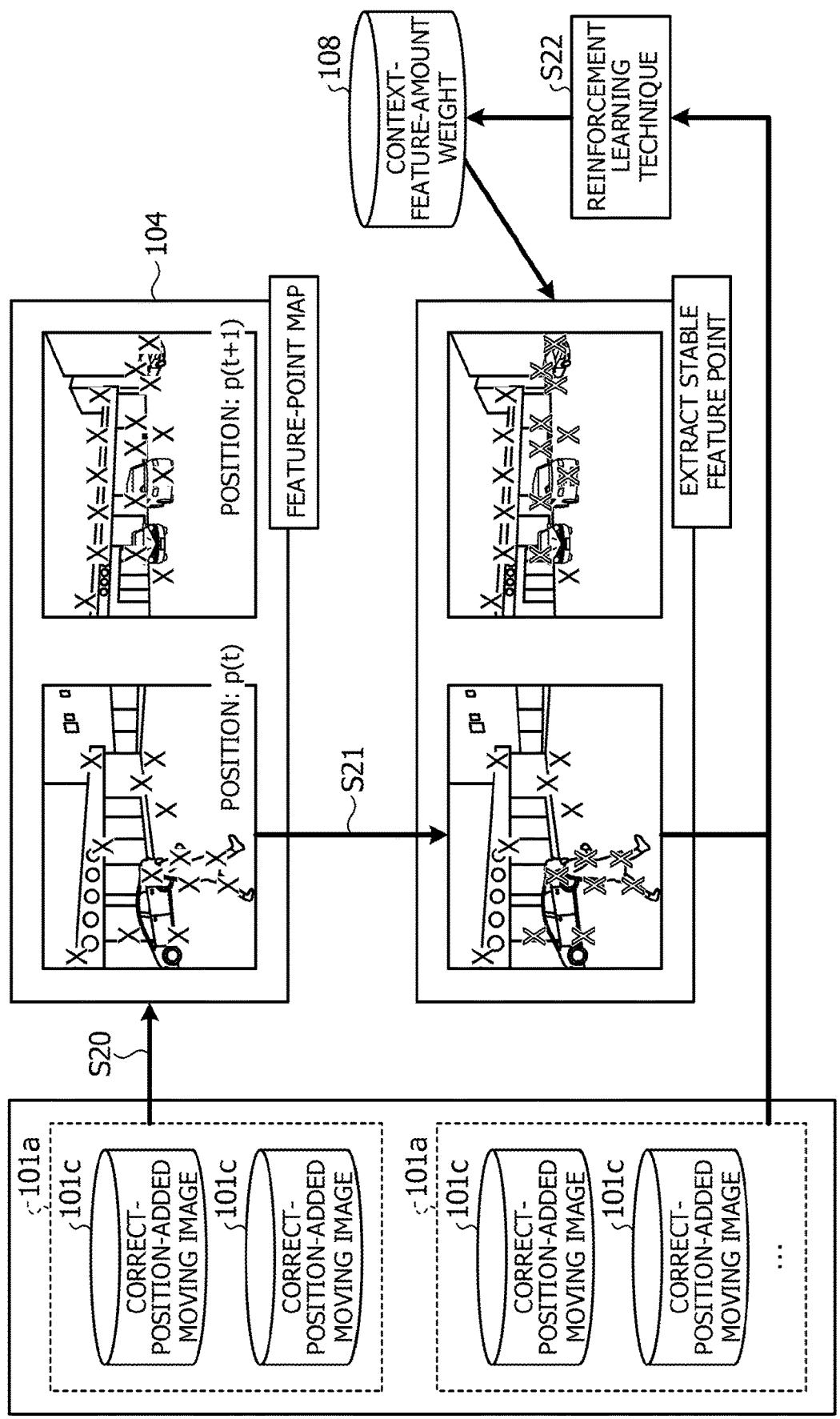
FIG. 10 is an explanatory illustration for describing weighting learning for context feature amounts.

FIG. 10 is an explanatory illustration for describing weighting learning for context feature amounts. As illustrated in FIG. 10, the context-feature-amount weight learning unit 107 uses correct-position-added moving images 101c each for which the correct position has been already known in the MMS travel data 101a traveled with the MMS or the like, and updates the context-feature-amount weight 108 so as to minimize errors in the self-position estimation.

Specifically, the context-feature-amount weight learning unit 107 uses the correct-position-added moving images 101c to create a feature-point map 104 (S20). Next, the context-feature-amount weight learning unit 107 uses the feature-point map 104 and the context-feature-amount weight 108 to extract a stable feature point (black "X") (S21). Next, the context-feature-amount weight learning unit 107 estimates a self-position from the stable feature point and the remaining correct-position-added moving images 101c, and updates, with a reinforcement learning technique such as Q-learning, the value of the context-feature-amount weight 108, on the basis of the difference between the self-position estimation and the correct positions (S22).

For the Q-learning, a state (S), an action (A), and a reward (r) are defined, and a value function ($Q^\Theta(S, A)$) of an action in each state is learnt. For example, if a value function $Q_\Theta(S, A2)$ of a certain action A2 is higher than a value function $Q^\Theta(S, A1)$ of a certain action A1 in the state S, this means selection of the action A2 is better.

When a weight for the context feature amount to be learnt is defined as $\Theta$, formulation is made as Expression (1) below and the weight of a feature amount of success in self-position estimation is learnt.

[Mathematical Formula 1]

$$Q_\Theta(S, A) = \Theta \cdot \phi(S, A) \qquad (1)$$

$$\text{where,}$$

$$\phi(S, A) = \begin{pmatrix} \phi(k_1, a_1) \\ \dots \\ \phi(k_n, a_n) \end{pmatrix} \quad \phi(k_i, a_i) = \begin{pmatrix} \text{sign}(a_i = 1) \cdot \phi(k_i) \\ \text{sign}(a_i = 0) \cdot \phi(k_i) \end{pmatrix}$$

$$\Theta = \begin{pmatrix} \theta \\ \dots \\ \theta \end{pmatrix} \qquad \theta = \begin{pmatrix} w(a=1) \\ w(a=0) \end{pmatrix}$$

Note that the state (S), the action (A), and the reward (r) in Expression (1) are defined as follows.
State (S): Estimated self-position result of a certain frame and read feature-point map (K)
$K=\{k_1, \ldots, k_i\}$: Each feature point of the read feature-point map
Action $(A)=\{a_1, \ldots, a_n\}$: whether the read feature point $k_i$ is used as a stable feature point for self-position estimation ($a_n=1$) or not ($a_n=0$)
Reward (r)=−C (error between correct position and estimated position is equal to or larger than a certain amount or the current position is lost) or 0 (error between correct position and estimated position is equal to or greater than a certain amount or other than that the current position is lost)

Figure 11:
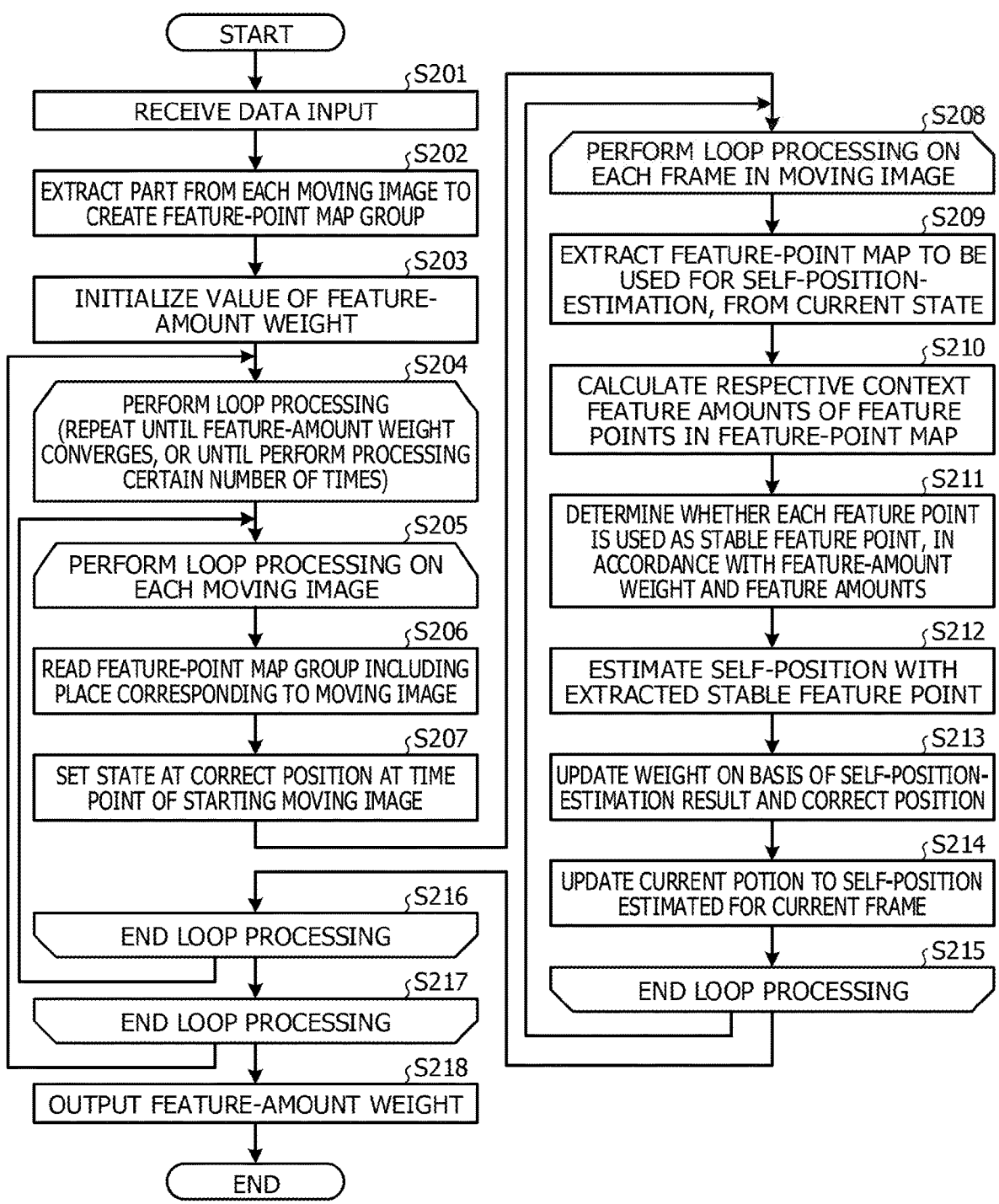
FIG. 11 is a flowchart exemplifying the operation of weighting learning.

FIG. 11 is a flowchart exemplifying the operation of weighting learning. As illustrated in FIG. 11, the context-feature-amount weight learning unit 107 receives data input of correct-position-added moving images 101c (S201), and extracts part from each correct-position-added moving image 101c to create feature-point maps 104 (S202). Next, the context-feature-amount weight learning unit 107 initializes the value of the context-feature-amount weight 108 (S203).

Next, the context-feature-amount weight learning unit 107 repeatedly performs loop processing (S204 to S217) with which the value of the context-feature-amount weight 108 is obtained until the context-feature-amount weight 108 converges to a certain value or until the processing is performed a certain number of times.

When the loop processing with which the value of the context-feature-amount weight 108 is obtained starts, the context-feature-amount weight learning unit 107 performs loop processing on each moving image (S205 to 216).

When the loop processing on each moving image starts, the context-feature-amount weight learning unit 107 reads feature-point maps 104 of including a place corresponding to the correct-position-added moving image 101c (S206). Next, the context-feature-amount weight learning unit 107 sets a state (S) at a correct position at the time point of starting the moving image (S207).

Next, the context-feature-amount weight learning unit 107 performs loop processing on each frame in the moving image (S208 to S215). Specifically, the context-feature-amount weight learning unit 107 extracts a feature-point map 104 to be used for self-position-estimation, from the current state (S) (S209), and calculates the respective context feature amounts of feature points in the extracted feature-point map 104 (S210).

Next, the context-feature-amount weight learning unit 107 determines whether each feature point is used as a stable feature point, in accordance with the context-feature-amount weight 108 and the context feature amounts, similarly to the stable-feature-point extraction unit 106 (S211).

Next, the context-feature-amount weight learning unit 107 estimates a self-position with the stable feature point extracted on the basis of the determination result of S211 (S212), and determines a reward (r) on the basis of the difference between the self-position-estimation result and the correct position to update the context-feature-amount weight 108 (S213). Next, the context-feature-amount weight learning unit 107 updates the current position to a self-position estimated for the current frame (S214), and continues the loop processing on each frame in the moving image.

When the context-feature-amount weight learning unit 107 ends the loop processing (S204 to S217), the context-feature-amount weight learning unit 107 outputs the obtained context-feature-amount weight 108 (S218), and end the processing.

Returning back to FIG. 1, the sensor input unit 201 receives an input from a sensor device such as a global positioning system (GPS), a laser scanner, or a camera mounted on the vehicle 2. Specifically, the sensor input unit 201 receives information on the travel position and orientation of the vehicle 2 from the sensor device such as the GPS or the like, together with a shot image shot with the camera during traveling of the vehicle 2. The sensor input unit 201 outputs the information received from the sensor device to the self-position estimation unit 202.

The self-position estimation unit 202 estimates the self-position of the vehicle 2, on the basis of the captured image of the camera mounted on the vehicle 2 and the information on the travel position and orientation of the vehicle 2, and information on the stable feature point extracted with the stable-feature-point extraction unit 106. The self-position estimation unit 202 outputs the estimated self-position of the vehicle 2 to the estimation-result output unit 203.

Figure 12:
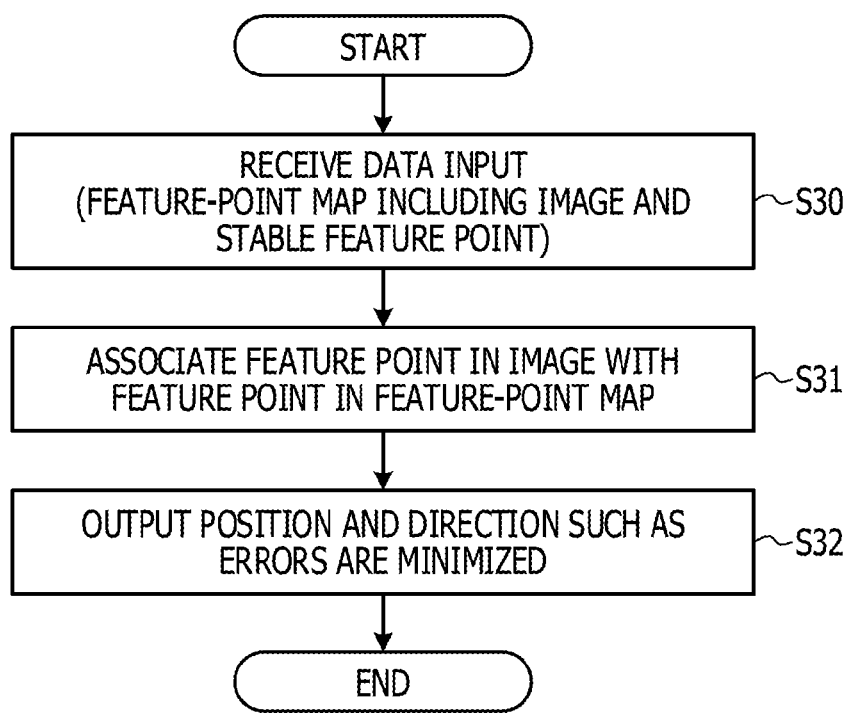
FIG. 12 is a flowchart exemplifying the operation of estimating a self-position.

FIG. 12 is a flowchart exemplifying the operation of estimating a self-position. As illustrated in FIG. 12, when the processing starts, the self-position estimation unit 202 receives data input of a feature-point map 104 including an image of a camera mounted on the vehicle 2 and the stable feature point (S30).

Next, the self-position estimation unit 202 associates a feature point included in the image of the camera mounted on the vehicle 2 with the stable feature point extracted with the stable-feature-point extraction unit 106 in the feature-point map 104 (S31). Next, the self-position estimation unit 202 uses a known self-position estimation algorithm, on the basis of the position information (three-dimensional position information) on the associated stable feature point and the information on the travel position and orientation of the vehicle 2, and outputs the position and direction of the vehicle 2 such as errors are minimizes (S32).

As described above, the self-position estimation unit 202 uses the stable feature point extracted with the stable-feature-point extraction unit 106 to estimate a self-position, thereby allowing inhibition of a destabilized estimation result.

The estimation-result output unit 203 outputs the self-position of the vehicle 2 estimated with the self-position estimation unit 202 to an external device. Examples of the external device to be an output destination of the estimation-result output unit 203 include a control device that controls autonomous movement on the basis of an estimated self-position, and a display device that displays the estimated self-position.

As described above, the information processing apparatus 1 includes the feature-point-map creation unit 102, the context-feature calculation unit 103, and the stable-feature-point extraction unit 106. The feature-point-map creation unit 102 acquires feature points from a shot image. The context-feature calculation unit 103 calculates, from each of the acquired feature points, with preset conditions, a plurality of context feature amounts having a success-or-failure vector of a single-attribute. The stable-feature-point extraction unit 106 extracts, from among the acquired feature points, feature points of which the product of the plurality of context feature amounts calculated is equal to or greater than a preset threshold. Therefore, the information processing apparatus 1 is capable of easily extracting a stable feature point, without use of feature amounts based on a long-time observation of a subject.

Note that the respective constituent elements of the illustrated apparatus and devices are not necessarily physically configured as illustrated in the drawings. That is, the specific aspects of separation and integration of each of the apparatus and devices are not limited to the illustrated aspects, and all or part of the apparatus or devices can be functionally or physically separated and integrated in any unit, in accordance with various loads and use status.

In addition, various processing functions executed with the information processing apparatus 1 may be entirely or optionally partially executed on a central processing unit (CPU) (or a microcomputer, such as a microprocessor unit (MPU) or a micro controller unit (MCU)). Furthermore, it is needless to say that whole or any part of various processing functions may be executed by a program to be analyzed and executed on a CPU (or a microcomputer, such as an MPU or an MCU), or on hardware by wired logic. Furthermore, various processing functions executed with the information processing apparatus 1 may be executed by a plurality of computers in cooperation though cloud computing.

Figure 13:
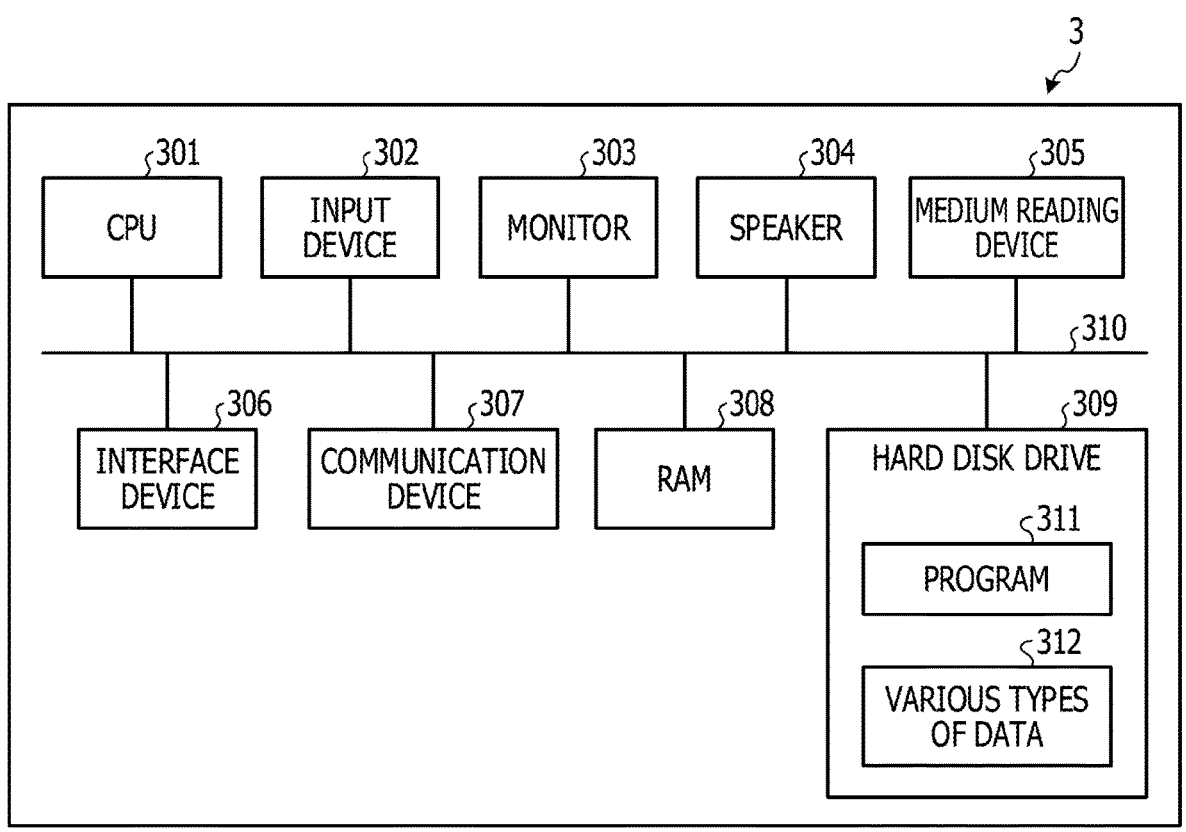
FIG. 13 is a block diagram of an exemplary computer that executes a program.

Meanwhile, the various types of processing described in the above embodiment can be achieved by execution of a prepared program on a computer. Thus, there will be described below an example of a computer (hardware) that executes a program with functions similar to the functions in the above embodiment. FIG. 13 is a block diagram of an exemplary computer that executes a program.

As illustrated in FIG. 13, a computer 3 includes a CPU 301 that executes various types of arithmetic processing, an input device 302 that receives data input, a monitor 303, and a speaker 304. In addition, the computer 3 includes a medium reading device 305 that reads a program and the like from a storage medium, an interface device 306 that is used for connecting to various devices, and a communication device 307 that makes communicative connection with an external device in a wired or wireless manner. Furthermore, the computer 3 also has a random access memory (RAM) 308 that temporarily stores various types of information, and a hard disk drive 309. Furthermore, each part (301 to 309) in the computer 3 is connected to a bus 310.

The hard disk drive 309 stores a program 311 that executes various types of processing in the functional configuration described in the above embodiment. In addition, the hard disk drive 309 stores various types of data 312 to which the program 311 refers. The input device 302 receives, for example, an input of operation information from an operator. The monitor 303 displays, for example, various screens operated by the operator. The interface device 306 is connected to, for example, a printing device. The communication device 307 is connected to a communication network such as a local area network (LAN), and exchanges various types of information with the external device via the communication network.

The CPU 301 reads the program 311 stored in the hard disk drive 309 and loads the program 311 into the RAM 308 to execute the program 311. Then, the CPU 301 executes the various types of processing. Note that, the program 311 may not be prestored in the hard disk drive 309. For example, the computer 3 may read the program 311 stored in a storage medium that is readable by the computer 3 and may execute the program 311. The storage medium that is readable by the computer 3 corresponds to, for example, a portable recording medium such as: a CD-ROM; a DVD disk; and a universal serial bus (USB) memory, a semiconductor memory such as a flash memory, and a hard disk drive. Alternatively, the program 311 may be prestored in a device connected to a public line, the Internet, a LAN, or the like, and the computer 3 may read the program 311 from the device to execute the program 311.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system comprising:
  an information processing apparatus including:
    a memory; and
    a processor coupled to the memory and configured to:
      acquire feature points from a shot image;
      calculate, from each of the acquired feature points, with preset conditions, a plurality of context feature amounts that has a success-or-failure vector of a single-attribute; and
      extract, from among the acquired feature points, feature points of which a product of the plurality of context feature amounts is equal to or greater than a preset threshold,
    wherein the single-attribute includes a position of each of the feature points in a shot space, movement of each of the feature points in the shot space, and existence probability of color or shape of each of the feature points in the shot space; and
  a vehicle configured to:
    acquire the shot image from a camera and travel position information of the vehicle from a sensor; and
    estimate a position of the vehicle based on the travel position information and the feature points from the information processing apparatus.

2. The information processing system according to claim 1, wherein the processor is configured to:
  further acquire, from the vehicle, the travel position information that indicates a position at which the image has been shot;
  creates map information that includes position information on the acquired feature points; and
  provide, into the map information, the plurality of context feature amounts calculated from each of the feature points.

3. The information processing system according to claim 2, wherein the vehicle is configured to:
  associate a feature point included in the shot image with a feature point extracted based on the plurality of context feature amounts included in the map information;
  estimate the position of the vehicle, based on the position information on the associated feature point; and
  output the estimated position of the vehicle.

4. The information processing apparatus according to claim 1, the processor is further configured to:
  learn weighting for each of the context feature amounts, based on each of the extracted feature points;
  reflect the learnt weighting on each of the context feature amounts; and
  extract a feature point of which a product of the context feature amounts after the reflection of the weighting is equal to or greater than the threshold.

5. The information processing system according to claim 1, wherein the vehicle is configured to output the estimated position to a control device configured to control an autonomous movement of the vehicle based on the estimated position or a display device configured to display the estimated position.

6. A non-transitory computer-readable recording medium recording a feature-point extraction program that causes a computer to execute processing comprising:
  acquiring feature points from a shot image;
  calculating, from each of the acquired feature points, with preset conditions, a plurality of context feature amounts that has a success-or-failure vector of a single-attribute;
  extracting, from among the acquired feature points, feature points of which a product of the plurality of context feature amounts is equal to or greater than a preset threshold, wherein the single-attribute includes a position of each of the feature points in a shot space, movement of each of the feature points in the shot space, and existence probability of color or shape of each of the feature points in the shot space;
  acquiring, by a vehicle, the shot image from a camera and travel position information of the vehicle from a sensor; and
  estimating, by a vehicle, a position of the vehicle based on the travel position information and the feature points from the information processing apparatus.

7. The non-transitory computer-readable recording medium according to claim 6, further comprising:
acquiring, from the vehicle, the travel position information that indicates a position at which the image has been shot;
creating map information that includes position information on the acquired feature points; and
providing, into the map information, the plurality of context feature amounts calculated from each of the feature points.

8. The non-transitory computer-readable recording medium according to claim 7, further comprising:
associating, by the vehicle, a feature point included in the shot image with a feature point extracted based on the plurality of context feature amounts included in the map information;
estimating, by the vehicle, the position of the vehicle, based on the position information on the associated feature point; and
outputting, by the vehicle, the estimated position of the vehicle.

9. The non-transitory computer-readable recording medium according to claim 6, further comprising:
learning weighting for each of the context feature amounts, based on each of the extracted feature points;
reflecting the learnt weighting on each of the context feature amounts;
extracting a feature point of which a product of the context feature amounts after the reflection of the weighting is equal to or greater than the threshold.

10. The non-transitory computer-readable recording medium according to claim 6, further comprising:
outputting the estimated position to a control device configured to control an autonomous movement of the vehicle based on the estimated position or a display device configured to display the estimated position.

11. A feature-point extraction method of executing processing with a computer, the processing comprising:
acquiring feature points from a shot image;
calculating, from each of the acquired feature points, with preset conditions, a plurality of context feature amounts that has a success-or-failure vector of a single-attribute;
extracting, from among the acquired feature points, feature points of which a product of the plurality of context feature amounts is equal to or greater than a preset threshold, wherein the single-attribute includes a position of each of the feature points in a shot space, movement of each of the feature points in the shot space, and existence probability of color or shape of each of the feature points in the shot space;
acquiring, by a vehicle, the shot image from a camera and travel position information of the vehicle from a sensor; and
estimating, by a vehicle, a position of the vehicle based on the travel position information and the feature points from the information processing apparatus.

12. The feature-point extraction method according to claim 11, further comprising:
acquiring, from the vehicle, the travel position information that indicates a position at which the image has been shot;
creating map information that includes position information on the acquired feature points; and
providing, into the map information, the plurality of context feature amounts calculated from each of the feature points.

13. The feature-point extraction method according to claim 12, further comprising:
associating, by the vehicle, a feature point included in the shot image with a feature point extracted based on the plurality of context feature amounts included in the map information;
estimating, by the vehicle, the position of the vehicle, based on the position information on the associated feature point; and
outputting, by the vehicle, the estimated position of the vehicle.

14. The feature-point extraction method according to claim 11, further comprising:
learning weighting for each of the context feature amounts, based on each of the extracted feature points;
reflecting the learnt weighting on each of the context feature amounts; and
extracting a feature point of which a product of the context feature amounts after the reflection of the weighting is equal to or greater than the threshold.

15. The feature-point extraction method according to claim 11, further comprising:
outputting the estimated position to a control device configured to control an autonomous movement of the vehicle based on the estimated position or a display device configured to display the estimated position.

* * * * *